(12) United States Patent
Hickman et al.

(10) Patent No.: US 6,819,680 B2
(45) Date of Patent: Nov. 16, 2004

(54) LINK AGGREGATION CONTROL FOR NETWORK DEVICES

(75) Inventors: Graeme A Hickman, Harpenden (GB); Maurice A Goodfellow, Dunstable (GB); Ernest L Bell, Hemel Hempstead (GB)

(73) Assignee: 3Com Corporation, Santa Clara, CA (US)

( * ) Notice: Subject to any disclaimer, the term of this patent is extended or adjusted under 35 U.S.C. 154(b) by 792 days.

(21) Appl. No.: 09/816,313

(22) Filed: Mar. 26, 2001

(65) Prior Publication Data

US 2002/0110148 A1 Aug. 15, 2002

(30) Foreign Application Priority Data

Jan. 30, 2001 (GB) ............................................. 0102314

(51) Int. Cl.$^7$ ................................................. H04J 3/24
(52) U.S. Cl. ....................... 370/475; 370/252
(58) Field of Search ................. 370/475, 252, 370/229

(56) References Cited

U.S. PATENT DOCUMENTS

| | | | |
|---|---|---|---|
| 6,512,742 B1 * | 1/2003 | Alexander et al. | 370/231 |
| 6,621,790 B1 * | 9/2003 | Wils et al. | 370/226 |
| 6,765,866 B1 * | 7/2004 | Wyatt | 370/229 |

FOREIGN PATENT DOCUMENTS

| | | |
|---|---|---|
| EP | 0876076 A2 | 1/1998 |
| EP | 1135000 A1 | 9/2001 |

* cited by examiner

Primary Examiner—Kenneth Vanderpuye
(74) Attorney, Agent, or Firm—Nixon & Vanderhye P.C.

(57) ABSTRACT

A link aggregator control which produces for a system in which the aggregator is located data units identifying the system and a partner identity for a partner system, and in response to a change from an old system identity to a new system identity produces data units identifying the new system identity and distinctively identifying the old system identity in place of the partner identity. Where the system identity and partner identity are each in the form of a globally administered unicast media access control the old system identity is represented in the form of a locally administered multicast address in place of the partner identity.

5 Claims, 12 Drawing Sheets

| A | | B |
|---|---|---|
| Actor= SW3, Partner= null | → | |
| | ← | Actor= SWB, Partner= SW3 |
| Actor= SW3, Partner= SWB | → | |

FIG. 5

| A | | B |
|---|---|---|
| Actor= SW3, Partner= null | → | |
| | ← | Actor= SWB, Partner= SW3 |
| Actor= SW3, Partner= SWB | → | |

FIG. 6

| B | | C |
|---|---|---|
| Actor= SW3, Partner= null | → | |
| | ← | Actor= SWB, Partner= SWB |
| Actor= SWB, Partner= SWB | → | |

FIG. 7

| A | | B |
|---|---|---|
| Actor= SW3, Partner= null | → | |
| | ← | Actor= SWB, Partner= SW3 |
| Actor= SW3, Partner= SWB | → | |

FIG. 8

| A | | B |
|---|---|---|
| Actor= SW3, Partner= null | → | |
| | ← | Actor= SWB, Partner= SW3 |
| Actor= SW1, Partner= [SW3] | → | |
| | ← | Actor= SWB, Partner= SW1 |
| Actor= SW1, Partner= SWB | → | |

FIG. 9

| A | | (incompatible) B |
|---|---|---|
| Actor= SW3, Partner= null | → | |
| | ← | Actor= SWB, Partner= SW3 |
| Actor= SW1, Partner= [SW3] | → | |
| | ← | Actor= SWB, Partner= SW1 |
| Actor= SW1, Partner= SWB | → | |

FIG. 10

| Message direction | LACP Message |
|---|---|
| 120 { P1⇒P5 | SW4, SWB |
| P2⇒P6 | SW4, SWB |
| P3⇒P7 | SW4, SWB |
| P4⇒P8 | SW4, SWB |
| P1⇐P5 | SWB, SW4 |
| P2⇐P6 | SWB, SW4 |
| P3⇐P7 | SWB, SW4 |
| P4⇐P8 | SWB, SW4 |
| A stack splits between A2 and A3 | |
| 121 { P3⇒P7 | SW4, SWB |
| P4⇒P8 | SW4, SWB |
| P3⇐P7 | SWB, SW4 |
| P4⇐P8 | SWB, SW4 |
| 122 { P1⇒P5 | SW2, SW4 (MCb, LAb= 1) |
| P2⇒P6 | SW2, SW4 (MCb, LAb= 1) |
| 123 { P1⇒P5 | SW2, SWB |
| P2⇒P6 | SW2, SWB |
| P1⇐P5 | SWB, SW2 |
| P2⇐P6 | SWB, SW2 |
| P3⇒P7 | SW4, SWB |
| P4⇒P8 | SW4, SWB |
| P3⇐P7 | SWB, SW4 |
| P4⇐P8 | SWB, SW4 |

LINK AGGREGATION CONTROL FOR NETWORK DEVICES

FIELD OF THE INVENTION

This invention relates to the management of network devices in packet-based communication networks and more particularly to link aggregation control, that is to say the configuration and control of a link aggregation media access control sub-layer of at least one device (an aggregator) which has a multiplicity of physical links to another device ('partner') which can be aggregated together to form a link aggregation group, such that a MAC 'client' can treat the link aggregation group as if it were a single link. More particularly the invention concerns the provision of greater resilience, that is to say an enhanced ability to tolerate physical changes to a system of links while reducing a need to deconstruct or modify an existing aggregation.

BACKGROUND OF THE INVENTION

As is well known, a packet-based data communication network generally comprises various forms of terminal equipment and intermediate devices such as switches, routers and repeaters which intercommunicate by means of links, constituting the transmission media for signals between the various devices. The links may be in physical form, such as twisted pair, coaxial cable, optical fibres and so on.

Generally, a particular link between a device and a remote partner has a bandwidth limited by the capabilities of the device (and more particularly the characteristics of a relevant port) although it is customary to ensure that a communication path including a link and the relevant ports on a device and its link partner operate according to one or other of a variety of transmission standards. It is frequently found that the traffic or expected traffic between a device and a link partner exceeds the capability of a particular link and it is therefore desirable to provide a plurality of parallel paths between the device and its partner. One manner of achieving this is known as 'trunking'. Another, which is more directly relevant to the subject matter of the present invention, is known as 'link aggregation'.

Link aggregation for CSMA/CD (Ethernet) systems is described in considerable detail in IEEE Standard 802 3ad-2000 (published by the Institute of Electrical and Electronic Engineers Inc NY 10016-5997, USA, under ISBN 0-7381-2472-9 SH94845). As is explained in that Standard, link aggregation in effect specifies a method for linearly incrementing a system's data rate by aggregating multiple physical links of the same speed into one logical link In this way bandwidth can be increased in unit multiples. Link aggregation also provides improved performance and resilience in that the failure of a single link within a link aggregation group need not cause failure from the point of view of a client.

Link aggregation control, which is also described in detail in the aforementioned Standard, enables in the absence of manual overrides an appropriate set of link aggregation groups to be automatically configured and automatically reconfigured if individual links are added to those groups. The link aggregation sub-layer may comprise a number of individual links in order to present a single MAC interface to a MAC client. In the aforementioned Standard there is a detailed description of link aggregation, particularly in relation to FIG. 43-2 which presents a block diagram of a link aggregation sub-layer and further FIGS. 43-3 to 43-19 which illustrate various state diagrams for link aggregation control.

In the aforementioned Standard, a device which can aggregate links to a remote partner is called an aggregator and is assigned a system identifier which includes a unique, globally administered individual MAC address (herein called ID) which corresponds to a MAC address assigned to one of its ports Currently the total system identifier is an 8-octet unsigned binary number of which the two most significant octets constitute the system priority, the third most significant octet is derived from the initial octet of the MAC address and the fourth to eighth octets are arranged to correspond to the second to sixth octets of the MAC address.

An automatically monitored and configured system of this general nature requires a protocol in order to standardise the manner in which information is exchanged between partner systems on a link to allow their link aggregation control entities to reach agreement on the identity of the link aggregation group to which the link belongs, to move the link to that link aggregation group and to enable transmission and reception to operate in a proper manner. The messages which are employed in the link aggregation control protocol (LACP) are known as LACPDUs (link aggregation control protocol data units) and each comprise an integral number of octets. They, are basic IEEE 802 3 frames and an example of the structure of an LACPDU is given in FIG. 43-7 of the aforementioned Standard and FIG. 4 herein Broadly, they are untagged frames which comprise a destination address, a source address, a length/type field, a sub-type field, a version number, an actor information field, an actor information length field, actor system priority, an Actor_System field, constituted by a system ID encoded as a globally administered, unicast MAC address, an actor key, an actor port priority, and actor port and an actor state followed by further information relating to the link partner and other fields not directly relevant to the present invention. The information relating to the partner includes a 'Partner_System' field of six octets, which is the partner's system ID, encoded as a globally administered, unicast MAC address. The two fields of most relevance to the present invention are the 'Actor_System' field and the 'Partner_System' field. As will be apparent, such data units are distinguished by appropriate parsing from 'ordinary' frames or data packets.

SUMMARY OF THE INVENTION

In current practice, there is no good means by which an aggregator can inform a partner that it no longer owns a system ID, for example because the ID no longer represents a MAC address relevant to the aggregation and accordingly the partner cannot presume that where a new aggregation has been made in the aggregator that an appropriate change in the partner's configuration can be created It is the purpose of the present invention to deal with this difficulty and in general to provide greater resilience in aggregating systems.

In a specific example of the present invention an aggregator detects when it no longer has control of a system ID and informs the partner system identifying both the old (i.e. superseded) system ID and a new system ID. In a preferred form of the invention, data units (specifically the LACPDUs) are modified to provide in place of the partner's ID the superseded system ID represented in a distinctive way, preferably in the form of a 'locally administered' multicast address.

Further objects and features will be apparent from the following detailed description with reference to the drawings.

BRIEF DESCRIPTION OF THE DRAWINGS

FIGS. 5 to 10 illustrate various sequences of LAPCDU messages.

DETAILED DESCRIPTION

Figure 1:
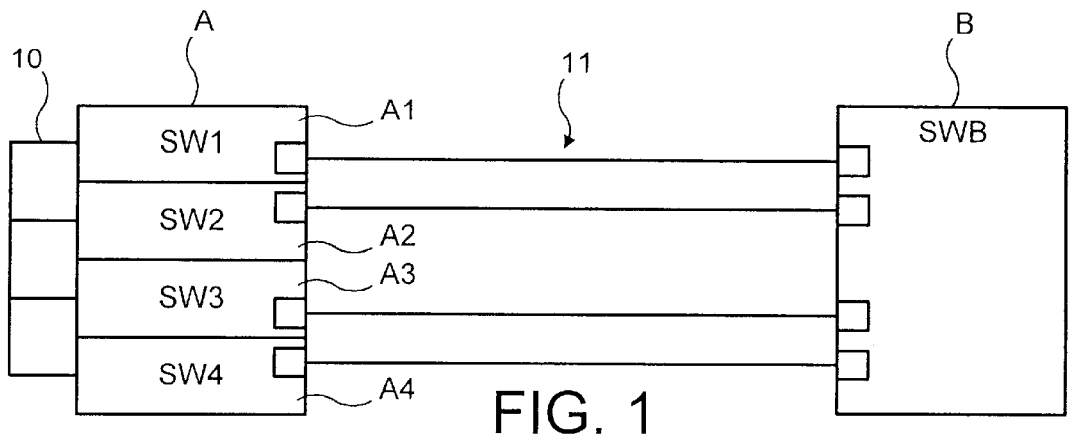
FIG. 1 is a simple drawing illustrating a system comprising an aggregator and a partner.

FIG. 1 illustrates two switches, constituted by a stack A of switches composed of switches A1 to A4 and a switch B. It will be presumed that a port on each of switches A1 to A4 is connected to a corresponding port on switch B and that the links between them constitute a link aggregation system of the kind defined in the aforementioned standard. In FIG. 1, the stack A is the aggregator and switch B is the partner.

It will be understood that 'stack' is used in its ordinary meaning in the art, to refer to a group of multi-port network units which are stacked or connected together so that they can form a single logical entity. Thus four switches may be stacked to form a single large switch. The stacking of switches or other units such as hubs and their control is fully described in a large number of publications. Normally the switches (or other units) in a stack are connected by a cascade, which allows packets received at any unit to be forwarded to any other unit in the stack and also provides communication of control messages between units in the stack. The cascade is schematically shown by line 10 in FIG. 1. In practice it may be a cascade as described in EP-A-0914734, EP-B-0912944, GB-2338155 and so on.

FIG. 1 also shows four links 11 each extending from a port on each of the switches in stack A to a respective port on switch B.

For multiple units in a stack to cooperate in providing an aggregated link, configured automatically through the operation of the link aggregation control protocol, each unit in the stack must identify itself as a member of the same 'system'. Therefore, one of the units in the stack must be elected to provide the system ID for the entire stack. As mentioned previously the system ID is derived from a MAC address for the elected switch. In the present invention it will be assumed that the relevant MAC addresses for switches A1 to A4 are SW1 to SW4 respectively and the relevant MAC address for switch B is SWB.

If a unit is removed from a stack, it is possible that the remaining stack no longer 'owns' the system ID that the protocol is using to identify this stack to its neighbouring systems. This can most obviously arise if the unit (e.g. A3) which provides the MAC address (e.g, SW3) for the system ID is a unit which is removed from the stack. The removal of a unit from the stack does not necessarily cause a problem since the link aggregation control protocol can elect another unit in the stack to provide the MAC address which will yield the system ID.

However, if the removed unit or units be subsequently added to the network as a separate system, the same system ID may be re-used to identify the newly independent system.

There would thus be two systems on the network both using the same system ID and, if they both shared a common neighbour system (i.e. switch B), the link aggregation control protocol of the common neighbour (B) would incorrectly see these as a single system and incorrectly configure an aggregate link shared between both systems. The result would be that some traffic would be misdirected.

This problem can occur either with or without misconfiguring of the switches. However, if the user has legitimately chosen to change to the physical configuration of the network there is a difficulty arising from the possible duplication of system IDs.

One unsatisfactory answer to the difficulty would be for the stack A to elect another unit to provide the system ID if that unit that had been providing the now superseded system ID were no longer a member of the stack. However, manual configuration of attributes to an aggregate link requires the link to be identified by the part of the system it is connected to, because the allocation of physical ports to specific aggregates cannot be guaranteed. Therefore the configuration information in the partner system (B) for the aggregate link will no longer be correct if the system ID changes. If this included attributes such as VLAN membership, then there may also be loss of connectivity for some users.

Figure 4:
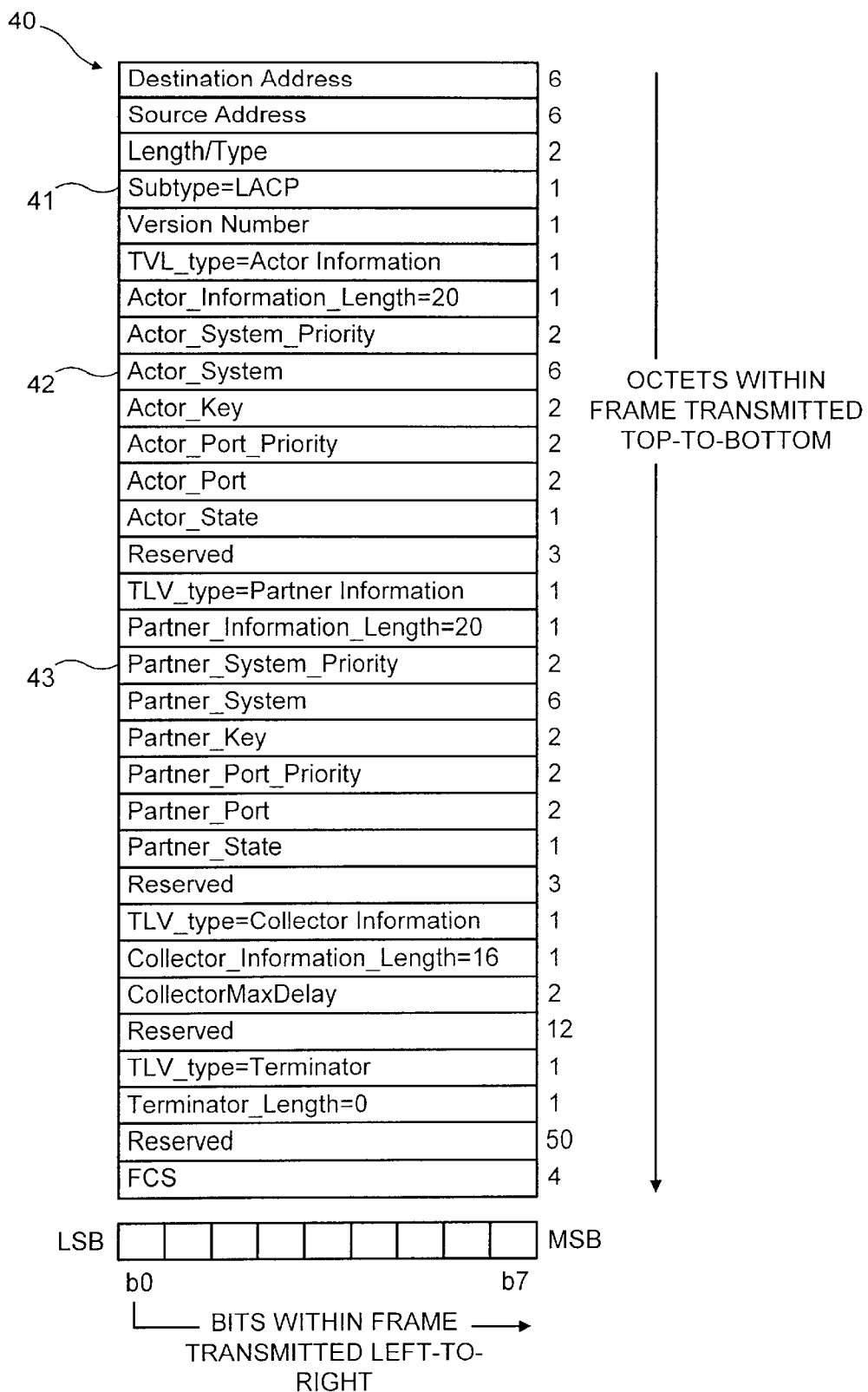
FIG. 4 is a schematic representation of a LAPCDU message.

FIG. 4 is a schematic representation of a LACPDU message 40, shown in fields from top to bottom. Each field has appended the respective number of octets and the bits within each octet are transmitted LSB first. The LACPDU is in the form of an Ethernet frame but is distinguishable by field 41. The relevant fields for the present example are the Actor_System field 42 and the Partner_System field 43, called herein the system ID and partner ID.

The modified protocol employed according to the present invention requires that when a system recognises that it no longer owns the system ID it had previously been using to identify itself in link aggregation control protocol exchanges, it must inform the partner system that it is changing, identifying the old system ID and the new system ID. The partner system can then automatically update the configuration information it has for the old system ID to use the new system ID instead.

It should be made clear that link aggregation control protocol does not select the port suitable for aggregation until the actor and the partner systems have seen acknowledgement of each others system IDs. This provides the opportunity to change the system ID reported in consecutive LACP messages to signal that a change has occurred and to acknowledge that the change is understood by the partner system.

FIGS. 5 to 10 illustrate the exchange of LACPDU messages between two switch stacks to illustrate both conventional exchanges and exchanges according to the present invention. In each of the cases shown in FIGS. 5 to 10, the LACPDU messages will be in the form shown in FIG. 4. For the sake of simplicity and brevity, in each of FIGS. 5 to 10 the message field 'Actor=X' represents the 6-octet Actor_System field which, in accordance with the Standard, is the elected 6-octet (48-bit) MAC address (X) of the aggregator Similarly 'Partner=Y' represents the Partner_System field.

FIG. 5 illustrates the messages between the switches A and B which are about to form an aggregation. They exchange a multiplicity of messages. Switch A initially defines itself (for example) as actor SW3, on the basis that MAC address SW3 is elected. Its LAPCDU has 'Actor_System' represented by the MAC address SW3. The Partner_System field is null because switch A does not know the ID of switch B. Switch B will respond with an Actor_System field set to SWB (i.e. the relevant MAC address for switch B) and the Partner_System field set to SW3. This is the normal operation of an aggregator and its partner.

Figure 2:
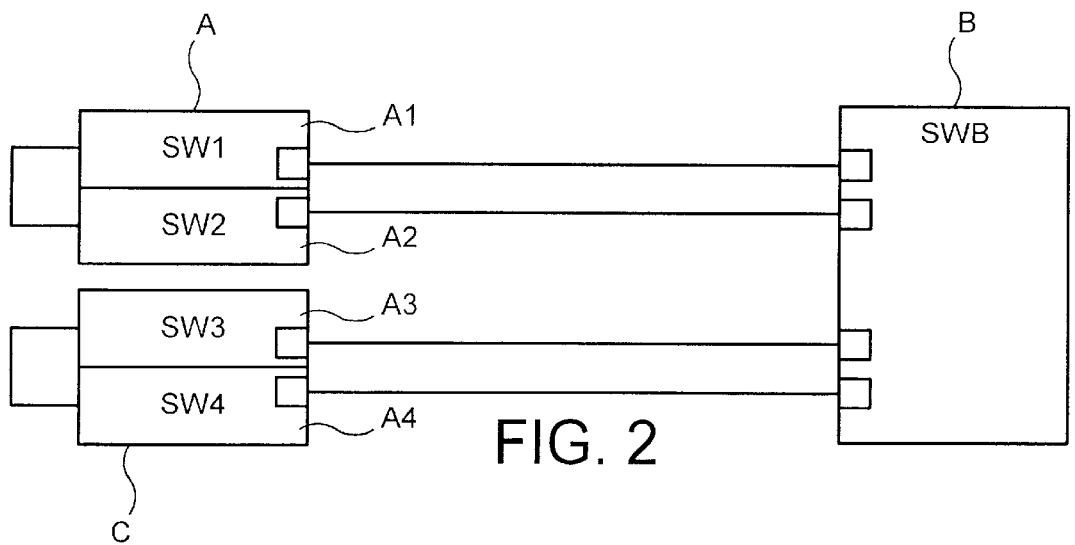
FIGS. 2 and 3 are modified forms of the system shown in FIG. 1.

Now let us suppose that switch stack A splits as shown in FIG. 2 so as to form switch stack A, composed of the stack A1 and A2 and switch stack C, composed of switches A3 and A4 Switches A and C are both separately connected to switch SWB. Switch A will retain its system ID, which means that the 'Actor_System' field in the LACPDU messages will correspond to the MAC address for switch SW3. It will be presumed that switch C will elect SW3, so that now switch C will send messages with the 'Actor_System' field corresponding to the MAC address for switch SW3. The resulting messages between switch A and switch B are shown in FIG. 6 and the messages between switch B and switch C are shown in FIG. 7. Switch A retains the system ID it used previously though that system ID really belongs to switch C. FIG. 6 shows that on each port connected between switch A and switch B, switch A provides an LACP signal identifying the actor as switch SW3. An exchange similar to that shown in FIG. 5 follows FIG. 7 shows the messages on each port connected between switches B and C. Switches B and C now agree on the systems at each end of the link so that they each configure an aggregate link. However, switch B must treat switches A and C as being on the same link so that it adds switch C to the aggregate link already configured for A.

Figure 3:
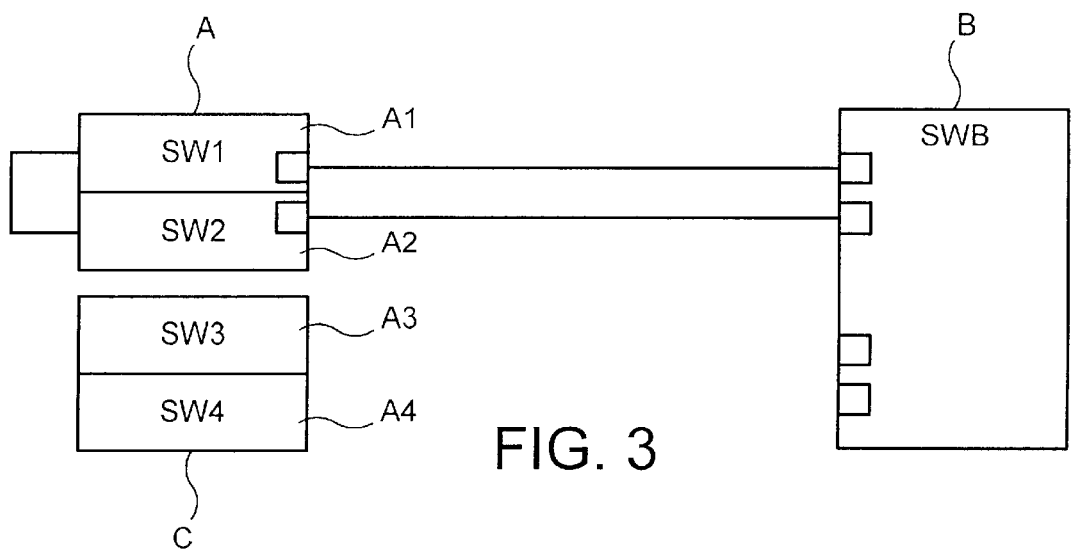

FIG. 3 illustrates a second problem wherein switch A 'splits' such that switches A3 and A4 (switch C) are no longer connected to switch B. The exchanges between A and B are shown in FIG. 8. Switch A does not own the system ID (SW3) it used previously so that it uses a new system ID, (assumed to be SW1). Switches A and B now agree on the systems at each end of the link so that they each configure the aggregate link. However, switch B does not recognise switch A as the partner it previously knew as switch C so that it does not apply the configuration information for switch C to the aggregate link. One consequence may be that a VLAN assignment made with the system ID=SW3 is not applied when the system ID=SW1.

FIG. 9 shows the resolution of the problem shown by a split in switch stack A splits to give switch A and switch C. Switch A remains connected to switch B although switch C is no longer connected to switch B. The first two messages are normal. After the split, switch A informs B of the change in system ID, using a message which has a new system ID (SW1) but in place of the partner's ID sends the superseded system ID (i.e. SW3) in a manner (shown in FIG. 9 by square brackets) which enables switch B to distinguish the message as one that conveys the superseded system ID. Switch A can determine from the fourth message that switch B has received the change of system ID. Switch A can now stop reporting (as shown by the fifth message) the change of system ID. Since switch B is a compliant switch, it can now update all configuration information that it held for the old system ID to refer to the new system ID.

FIG. 10 shows a comparative example similar to FIG. 9 wherein switch B does not have a modified link aggregator that can interpret the field shown as Partner=[SW3] in FIG. 9 Switch B is denoted 'incompatible'. The exchanges are as before. The difference will be that switch B will merely operate according to the existing protocol.

Switches A and B now agree on the systems at each end of the link so they each configure the aggregate link even though switch B does not recognise switch A as the partner it previously knew.

Figures 11, 12:
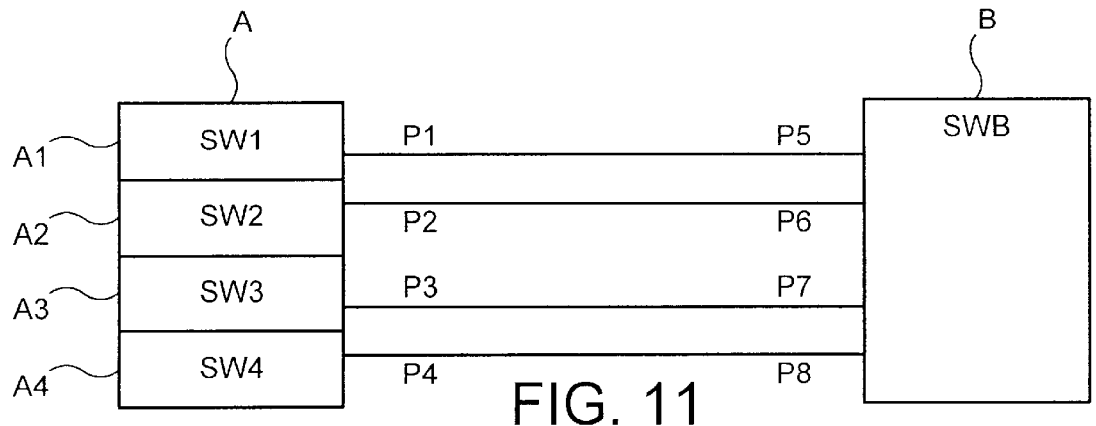
FIG. 11 is another illustration of a system similar to that in FIG. 1.
FIG. 12 is a summary of LACP messages between the units in the system shown in FIG. 11.

FIGS. 11 and 12 illustrate an aggregating system which splits and the LACP messages that pass between the various linked ports according to the preferred form of the invention.

FIG. 11 resembles FIG. 1 and likewise shows a switch stack. A composed of switches A1 to A4 A respective port P1 to P4 on each of these switches is linked to a respective one of ports P5 to P8 on the switch B (composed of single switch B). FIG. 12 shows in a first section the LACP messages between the ports. The same convention as before is adopted on assumption that SW4 is the system ID for switch stack A. Thus the Actor_System and Partner_System messages 120 from port P1 to port P5 correspond to the MAC addresses SW4 and SWB.

It is now assumed that the stack A is split between switches A2 and A3, but the links P1/P5, P2/P6, P3/P7 and P4/P8 are maintained.

The messages 121 between switch 'C' (now composed of switches A3 and A4) and switch B continue as before because the system ID has not changed.

However, the messages 122 between ports P1 and P5 and between ports P2 and P6 will change. It is now assumed that the newly elected switch within the reduced stack A (composed of switches SW1 and SW2) will be switch A2. From ports P1 to P2 there will be (as will be explained later) a message including a new actor (SW2) and the former actor (SW4). The second field is distinguished by the bits is denoted MCb and LAb. They are the 'multicast' bit (conventionally bit 47 of the MAC address field) which is set to 1 and the 'locally administered' bit which is also set to 1. Employing the convention adopted previously, the aggregator ports are sending a LACPDU message in which:

(a) the Actor_System field identifies the new system ID, encoded as a MAC address corresponding to the newly elected switch (SW2); and (b) the Partner_System field identifies the former system ID (corresponding to the MAC address for switch SW4) with, in effect, two flags, the MCb and LAb bits of the MAC address being set to 1. These flags will enable the recipient to detect that a change of system ID is being signalled, because, in place of a globally administered unicast MAC address for the field Partner_System there is a locally administered, multicast MAC address.

The messages 123 which follow are ordinary LACPDUs in the new circumstances.

Overview of System Operation

Figure 13:
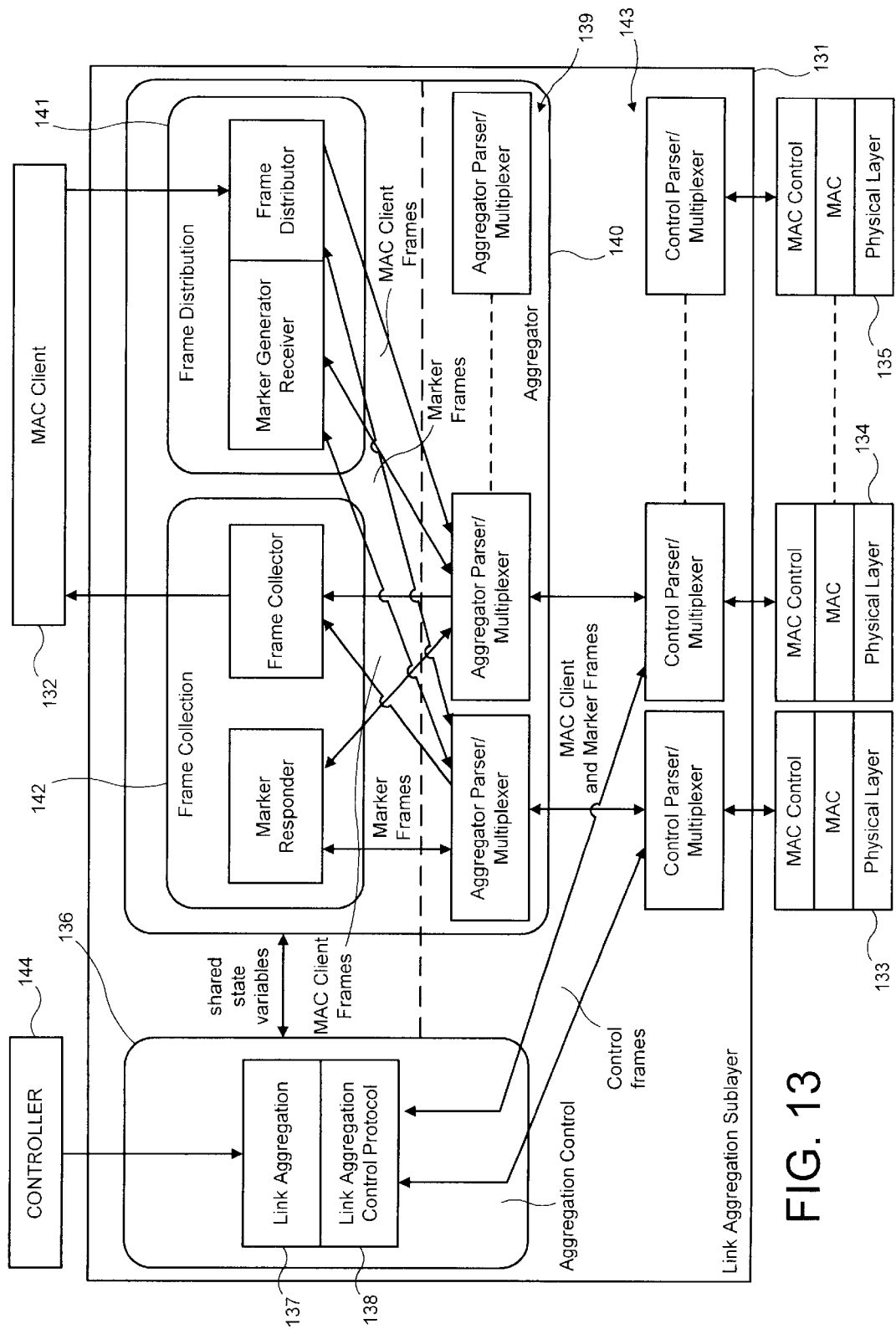
FIG. 13 is a schematic illustration of part of a network unit including a link aggregation sub-layer.

FIG. 13 is a schematic diagram which explains in broad terms the operation of a link aggregating sublayer in accordance with the aforementioned Standard. This is intended to provide those skilled in the art sufficient knowledge of the context and FIG. 13 and the remaining Figures are intended to be read in conjunction with the aforementioned standard which is incorporated herein by reference FIGS. 14 to 20 inclusive are flow diagrams which represent the operation of a modified link aggregating system in accordance with the invention. So far as the system operates normally (that is to say without any change of system ID) the reader is referred to the aforementioned Standard.

FIG. 13 shows a link aggregation sublayer 131 disposed between an MAC client 132 and a multiplicity of ports (133–135) connected to links which are to be controllably aggregated. The main purpose of link aggregation is to enable the MAC client to communicate with a set of ports through an aggregator, which is to present a standard IEEE 802 3 service interface to the client. The responsibility of the aggregator is to distribute frames or packets from the MAC client to the various ports and to collect frames received from the ports and pass them on to the MAC client transparently. Thus the MAC client has no control over which ports may be used for the transmission of any given frame but will treat the bound ports as a single logical instance for the purpose of forwarding frames or for the purpose of receiving frames. In practice, a link aggregation system may contain multiple aggregators serving a multiplicity of MAC clients. A given port may bind to, at most, a single aggregator at any time.

The binding of the ports to aggregators within a system is managed by the aggregation control function 136 which is responsible for determining which of the links may be aggregated, aggregating them, binding the ports within the system to an appropriate aggregator 140 and monitoring conditions to determine when a change in aggregation is needed. Although such determination and binding may be under manual control through direct manipulation of the state variables of link aggregation (the aforementioned keys) by a network manager, automatic determination, configuration, binding and monitoring may now be performed through the aggregation of the link aggregation control protocol. This employs, as fully explained in the standard, exchanges across the links to determine the aggregation capability of the various links and continuously provides the maximum level of aggregation capability achievable between the given pair of systems.

Specifically in FIG. 13, the MAC client 132 is coupled to the aggregator 140 which includes a frame collection function 142 and a frame distribution function 141. The frame collection function includes a marker responder which can send and receive marker frames to and from a multiplicity of aggregator parser/multiplexers 139, of which there is one for each possible port that may be aggregated. The frame distribution function includes a marker generator/receiver which can likewise send marker frames to and receiving marker frames from the parser/multiplexers 139. A frame collector within function 142 may receive MAC client frames from any of the aggregator parser/multiplexers and a frame distributor within the frame distribution function 141 can distribute MAC client frames to any of the aforementioned aggregator parser/multiplexers within the aggregator. MAC client and marker frames may proceed to and from control parser/multiplexers 143 of which there is one for each port. These parser/multiplexers 143 are each coupled to the MAC control for a port which includes a respective MAC device and the physical layer (coupled to the external transmission medium).

The aggregation control block 136 includes a link aggregation control 137 which provides control frames to the control parser/multiplexers and both transmits and receives shared state variables with the frame collection function and the frame distribution function. The link aggregation control is governed by the link aggregation control protocol 138 in the manner fully set forth in the aforementioned Standard.

The frame distribution function 141 is responsible for taking frames submitted by the MAC client and submitting them for transmission on the appropriate port based on a frame distribution algorithm employed by the frame distributor. The frame collection function 142 is responsible for passing frames received from the various ports to the MAC client. Each aggregator parser/multiplexer 139 on transmit simply passes frame transmission requests from the distributor. On receive, these parser/multiplexers 139 distinguish between marker request and responses and MAC clients, frames and pass them respectively to the marker responder and frame collector. The control parser/multiplexers on transmit simply pass frame transmission requests from the aggregator and control entities to the appropriate port On receive, these multiplexers distinguish link aggregation control protocol data units from other frames, passing the LACPDUs to the aggregation control 136 and all other frames to the aggregator 140.

New Elements

The present invention requires some additional elements and signal entities over and above those prescribed by the Standard. The new elements which are required for a specific example of the invention are as follows.

First, there is a 'ChangeOfSystemID_controller', which is a functional entity outside the LACP entity but within the bridge relay that controls the selection of the system identifier. Such a bridge relay is otherwise a known entity and will not be described. Two flags are conveniently provided. One is Report_ChangeOfSystemID, which is a Boolean flag when which when true indicates that a ChaneOfSystemID-LACPDU should be transmitted on the relevant link. The flag is false at all other times. A second flag, is a Received_ChangeOfSystemID, a Boolean flag which when true indicates that the unit has received a LACPDU indicating a change in system ID.

Another new variable is a counter variable (a number), called herein NumberOfChangeOfSystemIDLACPDUs_Sent, which is the number of LAPDUs sent advertising the current change of system identifier.

Finally, there is a variable called herein Replaced_SystemID, which holds the value of the superseded system ID which is being replaced by the new system ID.

Detailed System Operation

The addition of the new elements according to the present invention need not affect the status of any flag or state machine prescribed by the Standard. They will, in the described embodiment, affect the functional operation of the functions 'update_Selected', the function called 'update_Default_Selected' and also the operation of the transmit machine.

Figure 14:
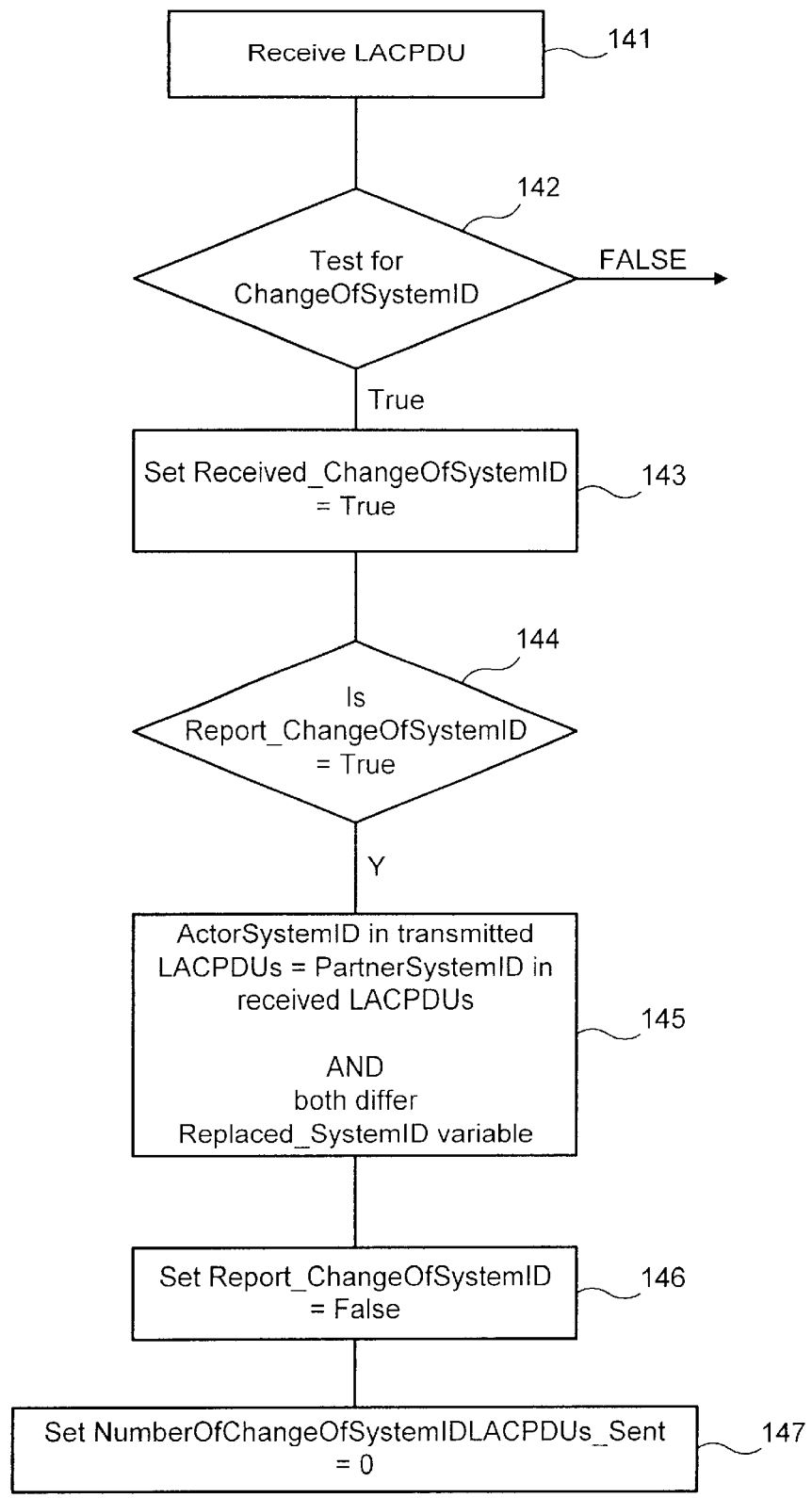
FIGS. 14 to 20 are schematic flow diagrams illustrating the operation of the link aggregator in accordance with the invention.

FIG. 14 is a flow diagram indicating the new actions of the link aggregation control consequent on the reception of a LACPDU and the occurrence of a change of the system ID. If on reception of a LACPDU (stage 141), the test for a ChangeOfSystemID (stage 142) is true, then a Boolean flag, Received_ChangeOfSystemID is set true, so as to indicate that the unit has received an LACPDU indicating a change of the system ID.

If the flag Report_ChangeOfSystemID is also true, (stage 144), then several checks must be made, as shown in stage 145. First, there is a check whether the Actor SystemID in the transmitted LACPDUs is equal to the Partner SystemID in received LACPDUs. Furthermore, both must be different from the Replaced_SystemID variable. If these results are all true, then the Report_ChangeOfSystemID flag will be set false (stage 145) and the counter variable NumberofChangeOfSystemIDLACPDUs_sent will be set to zero (stage 146).

Figure 15:
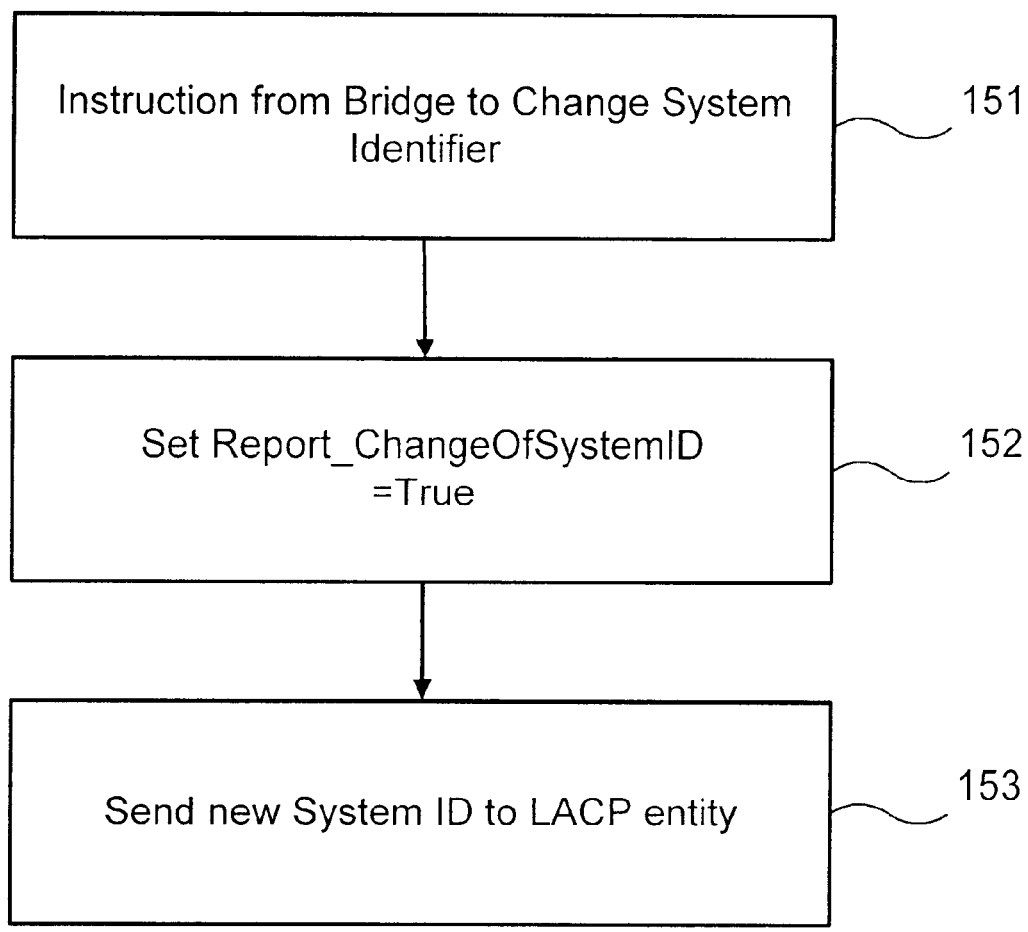
Figure 16:
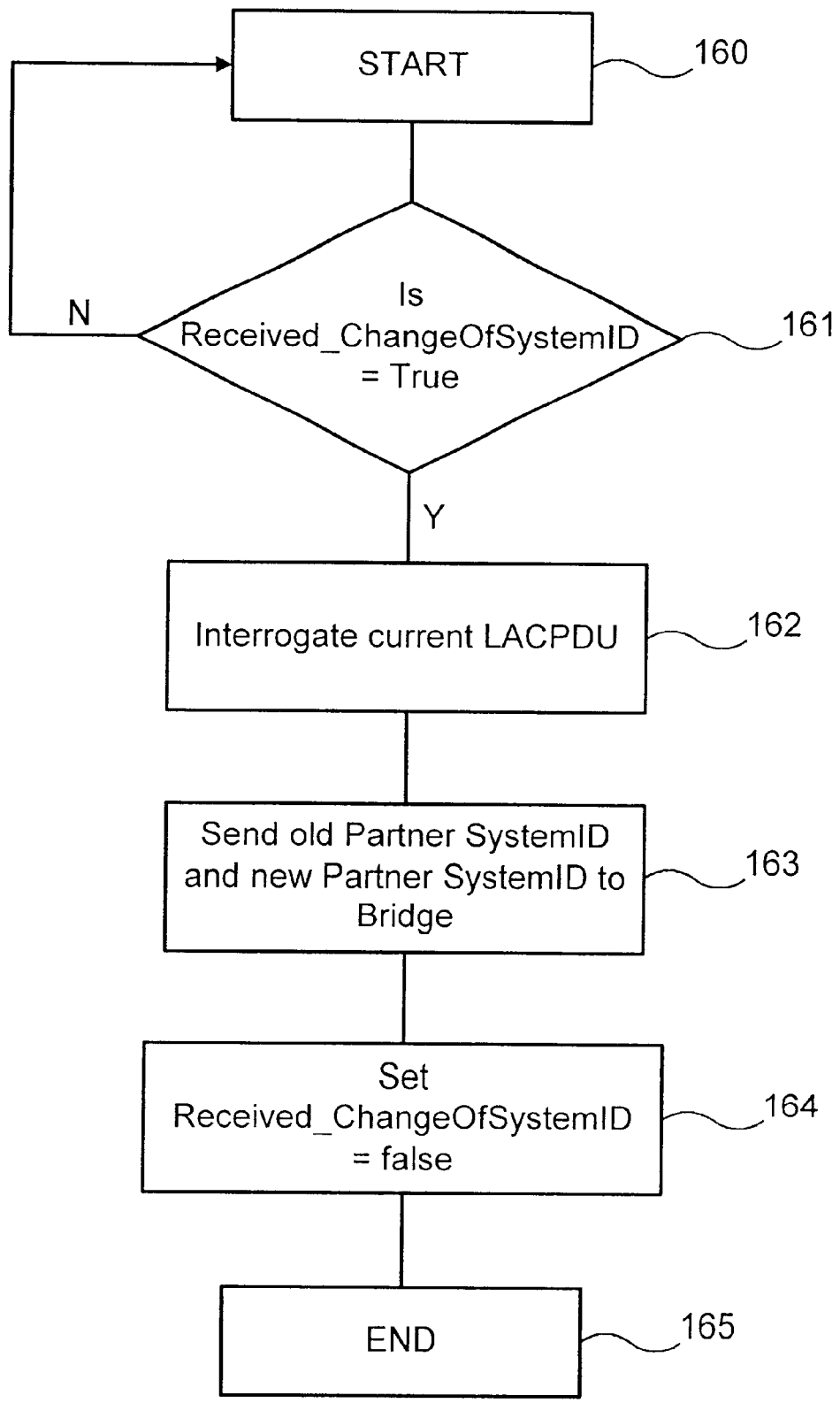

FIG. 15 and FIG. 16 illustrate the operation of the controller 144, which is the interface between the bridge relay and the link aggregator. The bridge relay will be responsible for an instruction 151 to change the system identifier. This occurs when, for example, the stack is split or there is a new election for the MAC device or ports to provide the system ID. The controller sets Report_ChangeOfSystemID true (stage 152) and sends the new system ID to the LACP entity (i.e. the link aggregation control).

FIG. 16 illustrates the operation of the controller from a start 160 in the event that the Boolean flag Received_ChangeOfSystemID is true, as shown in stage 161. The controller will interrogate the current LACPDU, stage 162, to obtain the 'old' Partner_SystemID and the new Partner SystemID which are contained in that LACPDU. Thus the flag is produced by the setting of the locally administered and multicast bits in a received LACPDU and the controller interrogates the received LACPDU to obtain the old and new system IDs. This is how the system extracts and interprets, for example, the system IDs 'SW2' and 'SW4' transmitted from ports P1 and P2 to ports P5 and P6 in FIG. 12 after the split of the switch stack A.

The controller will send the old and new PartnerSystemIDs to the bridge relay and set the Received_ChangeOfSystemID to false, stage 164, and end the cycle of operation, stage 165.

Figure 17:
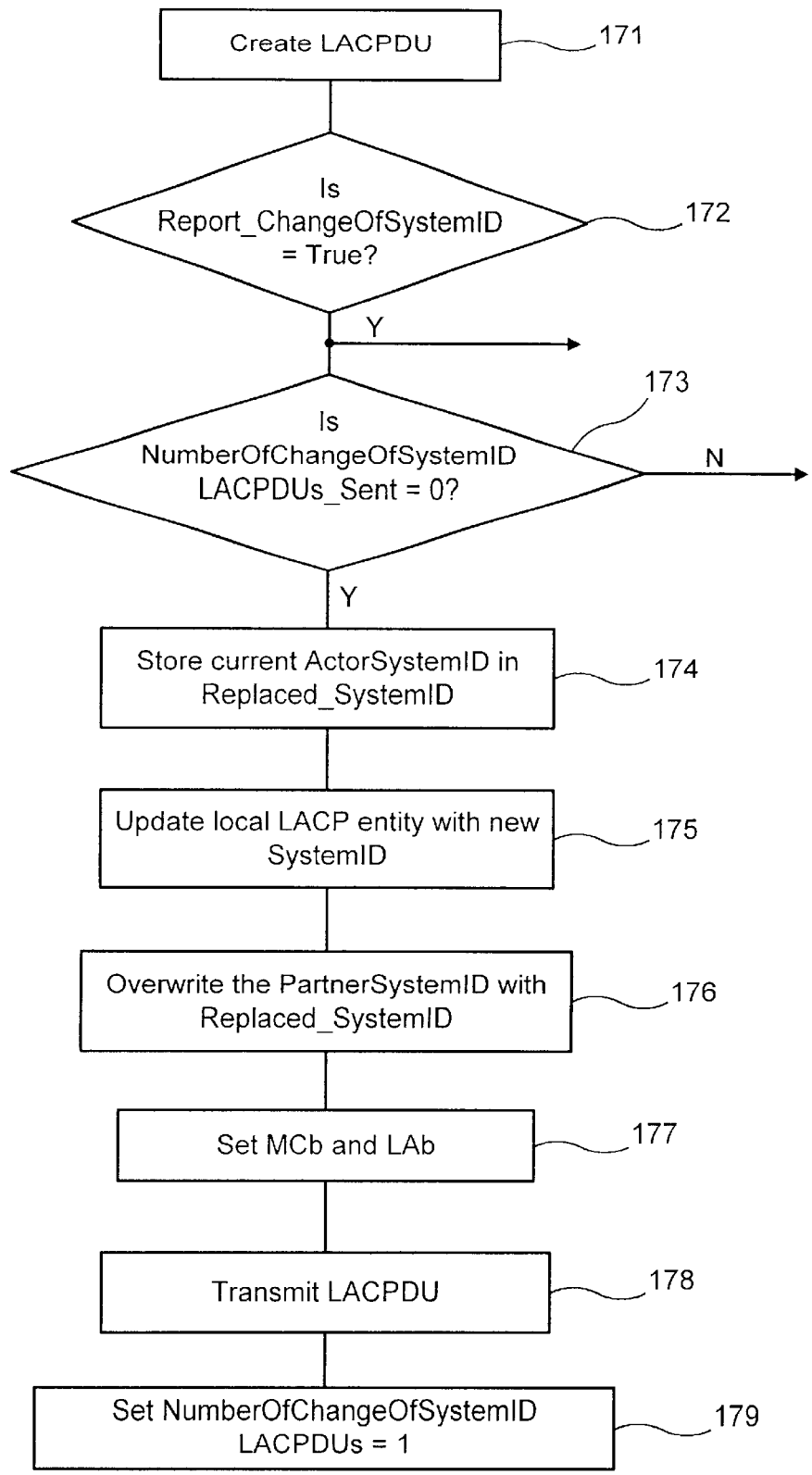

FIG. 17 illustrates the operation of the transmit machine, modified in accordance with the present invention.

Stage 171 represents the creation of the LACPDU in the normal way, as prescribed in the standard. In normal operation the transmit machine would then execute a stage 178, the transmission of the LACPDU. The other stages in FIG. 17 represent the modified operation.

Figure 18:
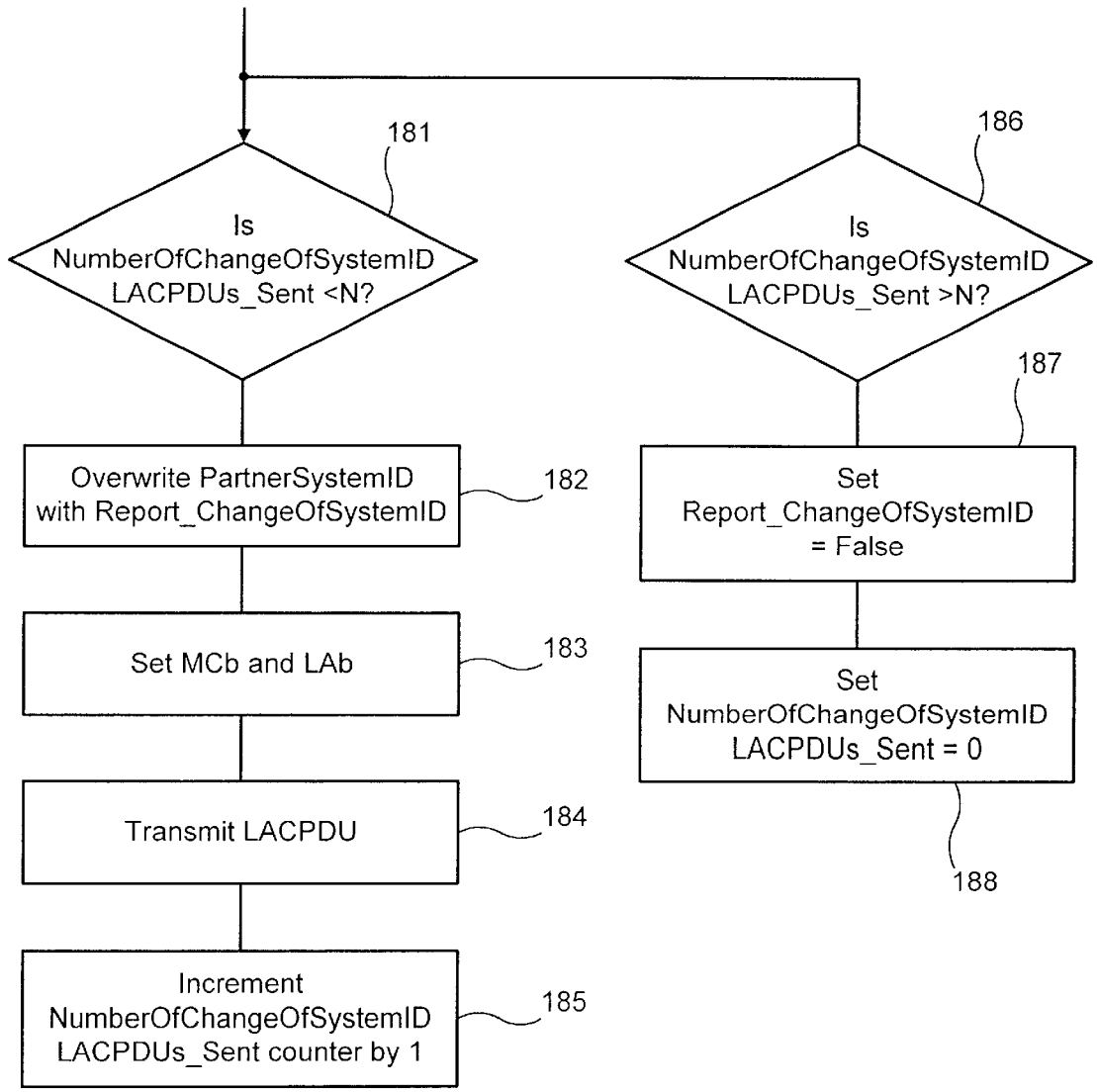

If, as shown in stage 172, the flag Report_ChangeOfSystemID is true, then a computation is made on whether the counter variable, NumberOfChangeOfSystemIDLACPDUs_Sent is equal to zero (stage 173) less than some arbitrary value (N), as shown in stage 181 in FIG. 18, or greater than that predetermined value, as shown in stage 186 of FIG. 18.

If the counter variable is zero, as shown in stage 173, the current ActorSystemID is stored in the Replaced_SystemID, stage 174, and the local LACP entity is updated with the new system ID, stage 175. The Partner_SystemID is overwritten (in the register employed for the purpose) with the Replaced_SystemID. The multicast bit MCb and the locally administered bit LAb are set, stage 177, and the LACPDU is transmitted, stage 178. FIG. 17 thus represents the action required to signal the ChangeOfSystemID in the manner described, for example, with reference to FIG. 12.

Finally, as shown in stage 179 of FIG. 17, the counter variable NumberOfChangeOfSystemIDLACPDUs is set equal to one.

If counter variable is non-zero but less than some predetermined value, as shown in stage 181, the PartnerSystemID is overwritten with the Report_ChangeOfSystemID, stage 182. The multicast bit and the locally administered bits are set as before, stage 183 and the LACPDU is transmitted, stage 184. Finally of course the counter for the NumberOfChangeOfSystemIDLACPDUs_Sent variable is incremented by unity.

The third possibility is that the counter variable is greater than the predetermined value. At this point there is an error condition, the partner having difficulty in understanding the change of variable, as shown for example in FIG. 10. At this point the Report_ChangeOfSystemID is set false, as shown in stage 187 and the counter variable for the NumberOfChangeOfSystemIDLACPDUs_Sent is cleared to zero, stage 188.

Figure 19:
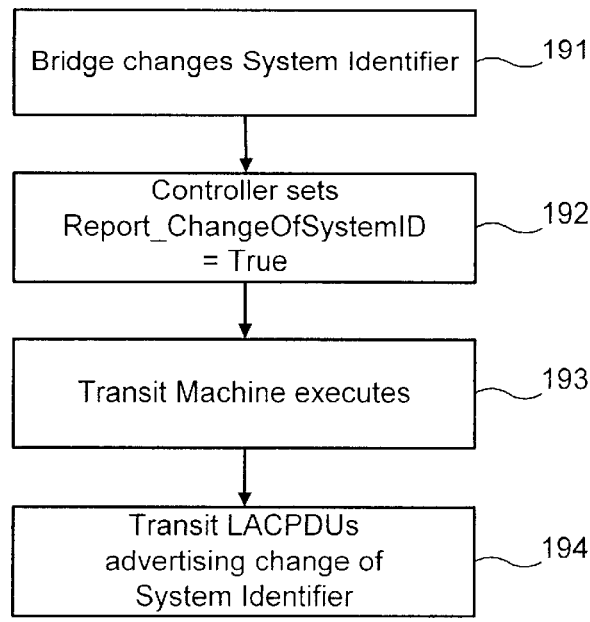
Figure 20:
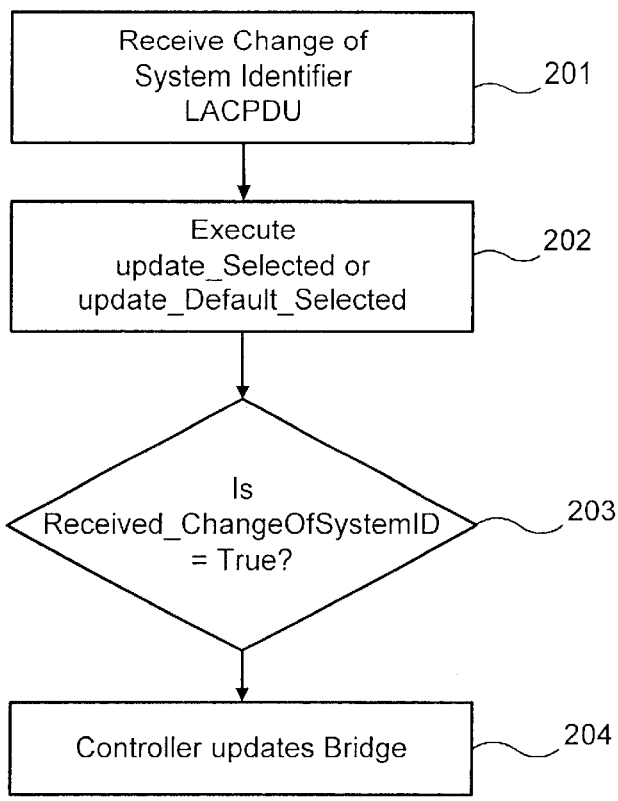

FIGS. 19 and 20 summarize the operation of the relationship between the controller, the aggregator and the bridge. Stage 191 indicates that the bridge changes the system identifier. Stage 192 indicates that the controller has set the flag Report_ChangeOfSystemID as true. The transmit machine executes its operation (stage 193), as shown in FIGS. 17 and 18 and transmits the LACPDUs advertising the change of system identifier (stage 194).

In the receive operation, as shown in stage 201, the controller receives a change of system identifier LACPDU. It executes the update_Selected or the update_Default_Selected functions, stage 202. If the Received_ChangeOfSystemID flag is true, stage 203, the controller will update the bridge, stage 204.

What is claimed is:

1. A link aggregator for sending and receiving data units that include a system identity for a system in which the aggregator is located and a partner identity for a partner system, the link aggregator including a link aggregation control for producing, in response to a change from an old system identity to a new system identity, a data unit which identifies the new system identity and distinctively identifies the old system identity in place of the partner identity.

2. A link aggregator according to claim 1 wherein the said system identity and partner identity are each in the form of a globally administered unicast media access control address and said link aggregator represents the old system identity in the form of a locally administered multicast address in place of the said partner identity.

3. A network switch for transmitting and receiving addressed data frames and including:

a multiplicity of ports;

a link aggregator for aggregating said ports, said link aggregator having means for sending and receiving by way of said ports link aggregation control protocol data units that each include a system identity and a link partner identity; and a link aggregation control for producing, in response to a change from an old system identity to a new system identity, a link aggregation control protocol data unit which identifies the new system identity and distinctively identifies the old system identity in place of said partner identity.

4. A network switch according to claim 3 wherein the said system identity and the said partner identity are in the form of a globally administered unicast media access control address and said link aggregation control sets in said address a locally administered bit and a multicast bit in respect of said old system identity.

5. A method of aggregating ports of multi-port network communication device, said method including:

(a) transmitting link aggregation control protocol data units each of which includes a system identity field, which identifies a first system constituted by a first group of said ports, and a partner system field, each of said fields having the form of a globally administered media access control address;

(b) transmitting, in response to a change of said first system, to a new system constituted by a modified group of said ports, modified link aggregation control protocol data units each of which includes said system identity field, which identifies said new system and has the form of a globally administered media access control address and, in place of said partner system field, a field which identifies said first system and has the form of a locally administered multicast address.

* * * * *